May 24, 1938.    F. K. ZERBE    2,118,388
METHOD OF MAKING A WELDED SPHERICAL VESSEL
Filed June 29, 1936
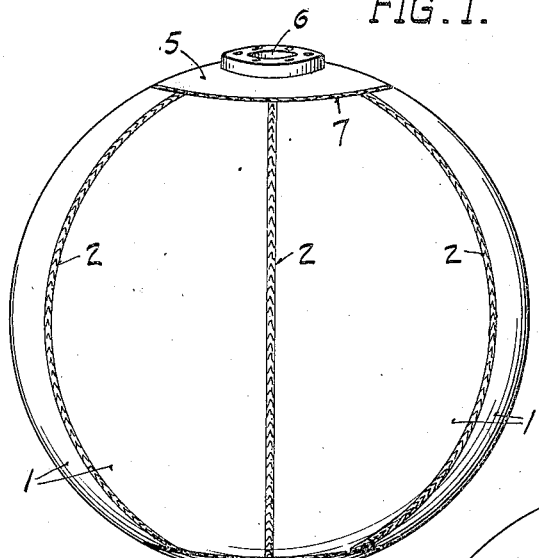
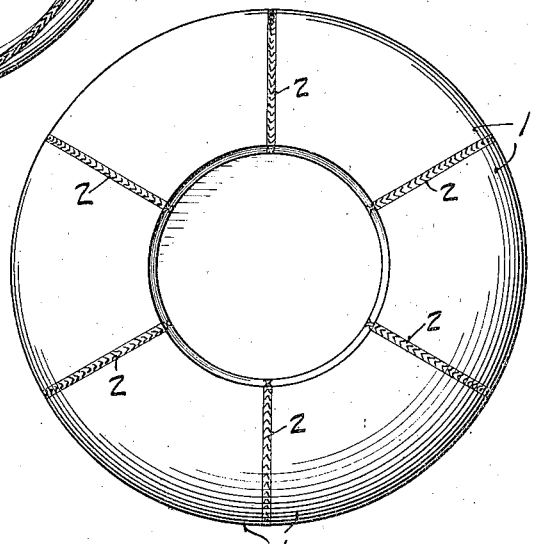
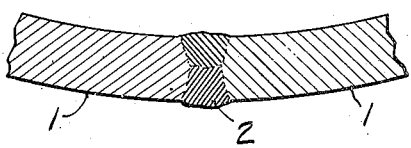
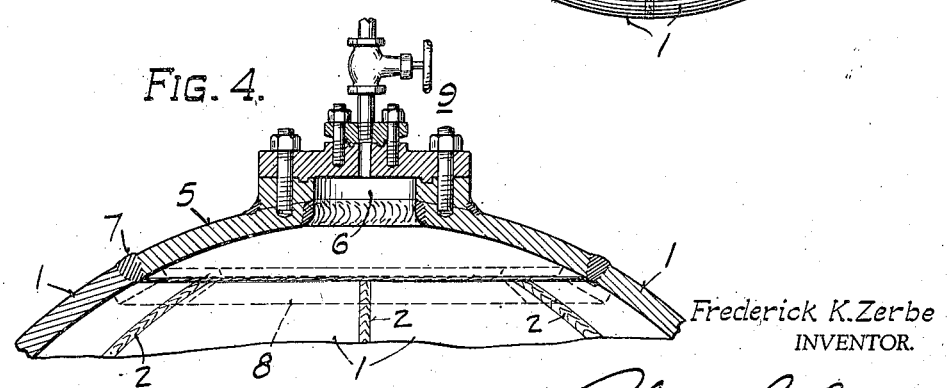
Frederick K. Zerbe
INVENTOR.
BY
ATTORNEY.

Patented May 24, 1938

2,118,388

UNITED STATES PATENT OFFICE 2,118,388

METHOD OF MAKING A WELDED SPHERICAL VESSEL

Frederick K. Zerbe, Waukesha, Wis., assignor to A. O. Smith Corporation, Milwaukee, Wis., a corporation of New York Application June 29, 1936, Serial No. 87,890

2 Claims. (Cl. 113—112)

This invention relates to a welded spherical vessel of a type adapted to transport and hold gases under very high pressures.

The object of the invention is to provide a substantially spherical pressure vessel in which the seams can be more readily welded and X-rayed to insure the highest quality of product for high pressure service.

Another object is to provide a novel method of constructing a high pressure vessel of substantially spherical shape.

The accompanying drawing illustrates the embodiment of the invention and the views are as follows:

Figure 1 is a perspective view of a welded vessel;

Fig. 2 is a top plan view just prior to securing the upper head in place;

Fig. 3 is a transverse section through one of the vertical seams in the vessel; and Fig. 4 is a similar section through the top head showing the final weld securing it in place.

The vessel is constructed of heavy plates formed in sections and welded edge-to-edge to complete the same. The main body of the vessel is made up of six plates 1, each being formed somewhat like a sector of an orange peel so that when fitted together circumferentially they form substantially the complete sphere except for top and bottom heads. Any number of plates may be employed. The seams 2 between the plates are preferably electric arc-welded using processes known to produce Class I welds in accordance with the Unfired Pressure Vessel Code of the American Society of Mechanical Engineers and also in accordance with the joint API-ASME Code. For this purpose the seams 2 are preferably welded in accordance with the process described in Patent No. 1,812,123. After welding, the seams are X-rayed in accordance with code requirements.

The bottom head 3, which is formed on the same curvature as the plates 1, is then secured to the end of the shell by similar welding procedure and the seam 4 X-rayed.

The top head 5 is formed on the same curvature as the shell and has an opening 6 at its center for receiving valve connections. Head 5 is positioned at the top of the shell and since the opening 6 is too small to allow access to the interior of the vessel for welding, the seam 7 is chamfered to allow all welding to be done from the outside. A removable copper chill strip 8 is placed beneath the seam on the inside and the procedure for welding is such as to secure full penetration of the lip edges at the bottom of the welding groove in the first pass of the electrode along the groove. After the welding of seam 7 is completed the chill strip 8 is preferably removed. Seam 7 is then X-rayed, this being possible by reason of its closeness to opening 6 which allows insertion of the required equipment for the short distance necessary.

The valve closure mechanism 9 is then secured to the head 5 at the opening 6 and the vessel is complete.

The construction of the vessel is Class I throughout and all seams are X-rayed. This greatly enhances the sale of the vessel for high pressure work. The vessel may be used as a storage tank or it may be used on railway cars or truck trailers in which case a plurality of such spherical vessels are secured in place to provide a multiple tank car or trailer. Its principal use is in holding gases under high pressures.

The invention is claimed as follows:

1. The method of fabricating a high pressure spherical container of heavy wall and employing Class I welded construction, comprising forming a body portion of a plurality of plates welded together edge-to-edge leaving a comparatively large opening therein, X-raying the welded seams in said body portion and utilizing said opening for inserting the required X-ray equipment, then welding a head in said opening, the head having a small opening therein through which X-ray equipment may be inserted for a small distance, X-raying the head seam of the vessel, and then securing a closure over the opening in said head.

2. The method of fabricating a welded vessel, comprising forming a plurality of plates to the required shape, assembling said plates edge to edge in complementary relation for forming the vessel and leaving an opening therein sufficiently large for insertion of suitable inspection and testing equipment, welding said plates together, inserting said equipment through said opening and determining therewith the quality of the welds, withdrawing said equipment, welding a final plate in said opening and having a relatively small opening therein, and inserting a part of said inspection and testing equipment through said latter opening and testing said last named weld therewith.

FREDERICK K. ZERBE.